United States Patent
Lee et al.

(10) Patent No.: US 12,249,946 B2
(45) Date of Patent: Mar. 11, 2025

(54) DEVICE FOR REMOVING RESIDUAL VIBRATION IN LINEAR RESONANT ACTUATOR AND METHOD FOR SAME

(71) Applicant: Dongwoon Anatech Co., Ltd., Seoul (KR)

(72) Inventors: Joon Seok Lee, Seoul (KR); Yu Hwang Lee, Seoul (KR); Jin Park, Seoul (KR)

(73) Assignee: Dongwoon Anatech Co., Ltd., Seoul (KR)

( * ) Notice: Subject to any disclaimer, the term of this patent is extended or adjusted under 35 U.S.C. 154(b) by 196 days.

(21) Appl. No.: 17/924,415

(22) PCT Filed: Feb. 22, 2021

(86) PCT No.: PCT/KR2021/002166
§ 371 (c)(1),
(2) Date: Nov. 10, 2022

(87) PCT Pub. No.: WO2021/230472
PCT Pub. Date: Nov. 18, 2021

(65) Prior Publication Data
US 2023/0188061 A1    Jun. 15, 2023

(30) Foreign Application Priority Data

May 12, 2020   (KR) .................. 10-2020-0056626

(51) Int. Cl.
*H02P 6/00* (2016.01)
*B06B 1/02* (2006.01)
*G06F 3/01* (2006.01)

(52) U.S. Cl.
CPC ............ *H02P 6/006* (2013.01); *B06B 1/0215* (2013.01); *G06F 3/016* (2013.01)

(58) Field of Classification Search
CPC .......... H02P 6/006; B06B 1/0215; G06F 3/016
(Continued)

(56) References Cited

U.S. PATENT DOCUMENTS

| | | |
|---|---|---|
| 2014/0118126 A1 | 5/2014 | Garg et al. |
| 2015/0280621 A1 | 10/2015 | Garg et al. |

FOREIGN PATENT DOCUMENTS

| | | |
|---|---|---|
| JP | 2019217496 A | 12/2019 |
| KR | 1020150116836 A | 10/2015 |

(Continued)

OTHER PUBLICATIONS

Lee et al. (WO 2020004841 A1)Actuator Control Device and Method Date Published Jan. 2, 2020 (Year: 2020).*

(Continued)

*Primary Examiner* — Jorge L Carrasquillo
(74) *Attorney, Agent, or Firm* — Sunstein LLP (57) ABSTRACT

The present invention relates to a haptic feedback system, and in particular to a device and method for rapidly removing residual vibration in a linear resonant actuator, the method driving the linear resonant actuator by applying a resonant frequency thereto to implement a haptic function and applying a braking signal for removing the residual vibration after the driving of the linear resonant actuator, wherein the braking signal is
a driving wave for generating the same vibration waveform as a residual vibration waveform of the linear resonant actuator, and is applied to the linear resonant actuator at a point of time when a BEMF signal of the linear resonant actuator crosses a zero point, the braking signal being applied in an opposite direction in which it is possible to cancel the residual vibration waveform of the linear resonant actuator.

2 Claims, 8 Drawing Sheets

(58) Field of Classification Search
USPC .......................................................... 318/135
See application file for complete search history.

(56) References Cited

FOREIGN PATENT DOCUMENTS

| KR | 101709577 B1 | 3/2017 |
| KR | 1020200001772 A | 1/2020 |

OTHER PUBLICATIONS

Kim et al. (KR 101709577 B1) A Residual Vibration Control System, An Optical Inspection Apparatus Using The Same And A Finishing Apparatus Using The Same Date Published Mar. 9, 2017 (Year: 2017).*
Cho et al. (WO 2014104452 A1) Device and Method for Generating Vibrations Date Published Jul. 3, 2014 (Year: 2014).*
International Searching Authority/KR, International Search Report and Written Opinion of the International Searching Authority, Application No. PCT/KR2021/002166, dated Jun. 9, 2021, 9 pages.

* cited by examiner

ns of international patent application no. PCT/KR2021/002166 filed Feb. 22, 2021 and claims the benefit of Korean patent application No. 10-2020-0056626, filed May 12, 2020, the disclosures of which are incorporated herein by reference in their entirety.

TECHNICAL FIELD

The present invention relates to a haptic feedback system, and more particularly, to a device for rapidly removing residual vibration of a linear resonant actuator and a method for the same.

BACKGROUND ART

Figure 1:
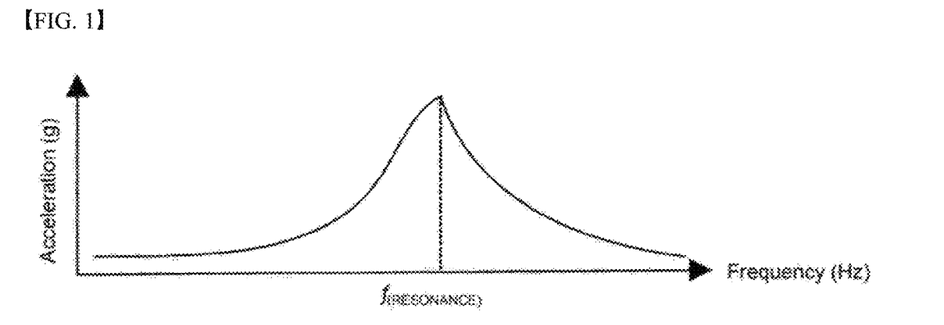
FIG. 1 is an exemplary diagram of the frequency characteristics of a general linear resonant actuator (LRA).

Smartphones and various electronic products are equipped with a linear resonant actuator (referred to LRA, preferably interpreted as a concept including a motor) in order to support a haptic function. The LRA has a specific resonant frequency, and as shown in FIG. 1, the intensity of vibration becomes maximum at the resonant frequency.

Due to the resonance characteristics, residual vibrations with damping properties exist even if the LRA stops driving, and due to the residual vibrations, user intimacy for haptic sensibility is inevitably reduced.

Figure 2:
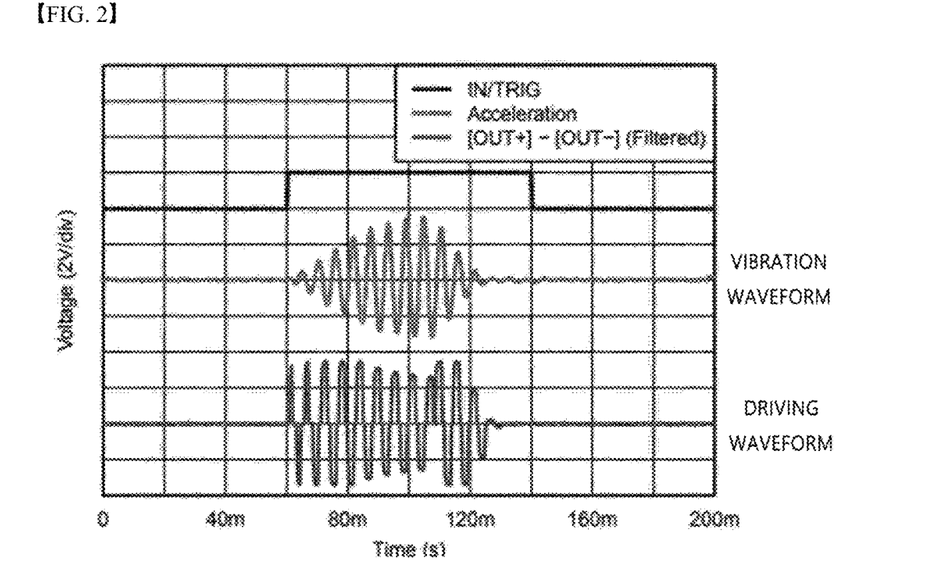
FIG. 2 is an exemplary diagram of a vibration waveform and a braking signal waveform of the general LRA.

As shown in FIG. 2, as a method for removing residual vibration, there is a method for reducing residual vibration by repeatedly applying a signal opposite to a driving wave several times to reduce the residual vibration after driving at a resonant frequency.

The problem with the method in the related art is that since the magnitude and duration of residual vibration are different for each LRA manufacturer and characteristics such as delay time are different in driving the LRA, even if a driving waveform for removing the residual vibration is found in an LRA of a specific company, the driving waveform for removing the residual vibration is not able to be used as it is for the LRA of another company and as a consequence, a new driving waveform for removing residual vibration has to be found, and furthermore, since the method for removing residual vibration in the related art is a method of applying an opposite signal of the driving wave several times, the magnitude of the residual vibration and the residual vibration time of the actuator may not be minimized, which may result in a problem that haptic vibrations with various and rich sensibilities, such as short and interrupted vibrations may not be provided.

CITATION LIST

Patent Literature (Patent Literature 1) US Patent Publication No. US2015-0280621.

DISCLOSURE OF THE INVENTION

Technical Problem

The present invention is an invention devised to solve the above problems, and the main object of the present invention is to provide a device for removing residual vibration of a linear resonant actuator capable of removing the residual vibration of the linear resonant actuator in an instant and a method for the same, and furthermore, another object of the present invention is to provide a device for removing residual vibration of a linear resonant actuator capable of increasing the satisfaction of haptic sensibility by minimizing the magnitude of the residual vibration magnitude and residual vibration time of the linear resonant actuator and a method for the same.

Technical Solution

In order to achieve objects described above, according to an embodiment of the present invention, there is provided a method for removing residual vibration of a linear resonant actuator that is executable in a device including an actuator driving circuit for driving the linear resonant actuator and a control logic for controlling driving of the linear resonant actuator, the method including:

driving the linear resonant actuator by applying a resonant frequency thereto to implement a haptic function; and applying a braking signal for removing the residual vibration after the driving of the linear resonant actuator, in which the braking signal is a driving wave for generating the same vibration waveform as a residual vibration waveform of the linear resonant actuator, and is applied to the linear resonant actuator at a point of time when a back electromotive force (BEMF) signal of the linear resonant actuator crosses a zero point, the braking signal being applied in an opposite direction in which it is possible to cancel the residual vibration waveform of the linear resonant actuator.

Furthermore, in the method for removing residual vibration of the linear resonant actuator, the braking signal may be a unit step driving wave for generating the same vibration waveform as the residual vibration waveform of the linear resonant actuator, a voltage magnitude of the braking signal may be set to one of magnitude values in a linear relationship with a vibration gain of the linear resonant actuator, and in some cases, the unit step driving wave may be repeatedly applied twice or more to remove the residual vibration waveform of the linear resonant actuator.

According to another embodiment of the present invention, there is provided a device for removing residual vibration in a linear resonant actuator including:

an actuator driving circuit for driving the linear resonant actuator;

a control logic for controlling driving of the linear resonant actuator; and a zero cross point detection unit for detecting a zero cross point of a BEMF signal by the driving of the linear resonant actuator, in which The actuator driving circuit includes a braking signal generator for generating a braking signal that generates the same vibration waveform as a residual vibration waveform of the linear resonant actuator, and the control logic controls the actuator driving circuit so that the braking signal for removing the residual vibration after the driving of the linear resonant actuator is applied to the linear resonant actuator at a point of time when the BEMF signal crosses a zero point, the braking signal being applied in an opposite direction in which it is possible to cancel the residual vibration waveform of the linear resonant actuator, and furthermore, the braking signal generator may further include a boost converter, and the control logic may generate the braking signal by driving the boost converter when a voltage required to generate the braking signal is higher than a voltage of a power supply.

Advantageous Effects

According to the above-described technical solutions to the problem, the present invention has an advantage of being capable of removing residual vibration of the linear resonant actuator in an instant by applying a unit step driving wave having the same vibration waveform characteristics as the residual vibration waveform of the linear resonant actuator as a braking signal, where the applying is done in the opposite direction in which the residual vibration waveform of the linear resonant actuator is cancelled at the point of time when the BEMF signal of the linear resonant actuator crosses the zero point, and furthermore, in the present invention, it is possible to create short and interrupted vibrations that have been previously impossible on screens of, for example, collisions and gun shot during watching video by minimizing the magnitude of the residual vibration and the residual vibration time of the linear resonant actuator, and as a result, the present invention has an effect of increasing the satisfaction of the user with the haptic sensibility.

MODE FOR CARRYING OUT THE INVENTION

The following detailed description of the present invention will be discussed with reference to the accompanying drawings, which show by way of illustration a specific embodiment in which the present invention may be practiced, in order to make the objects, technical solutions and advantages of the present invention clearer. These embodiments are described in sufficient detail to enable those skilled in the art to practice the present invention.

Furthermore, throughout the present description and claims, the word 'comprise' and variations thereof are not intended to exclude other technical features, additions, components or steps. Other objects, advantages and characteristics of the present invention will appear to a person skilled in the art, in part from this description, and in part from practice of the present invention. The following examples and drawings are provided by way of illustration and are not intended to limit the present invention. Moreover, the present invention encompasses all possible combinations of the embodiments indicated herein. It should be understood that the various embodiments of the present invention are different but need not be mutually exclusive. In addition, it should be understood that the location or arrangement of individual components within each disclosed embodiment may be changed without departing from the spirit and scope of the present invention. Accordingly, the detailed description set forth below is not intended to be taken in a limiting sense, and the scope of the present invention, if properly described, is limited only by the appended claims, along with all equivalents to those claimed.

In the present specification, unless otherwise indicated or clearly contradicted by context, items referred to in the singular encompass the plural, unless the context requires otherwise. Furthermore, in the description of the present invention, if it is determined that the detailed description of the known technology related to the present invention may unnecessarily obscure the subject matter of the present invention, the detailed description thereof will be omitted.

First, before describing a device for removing residual vibration of a linear resonant actuator (LRA) and a method for the same according to embodiments of the present invention, in order to efficiently brake the residual vibration of the linear resonant actuator, the following three factors have to be determined.

Determinations have to be made as to how much force (driving force) is required in driving to completely remove residual vibration, 2) when the opposite waveform has to be applied to completely remove residual vibration, 3) what driving waveform has to be applied.

Figure 3:
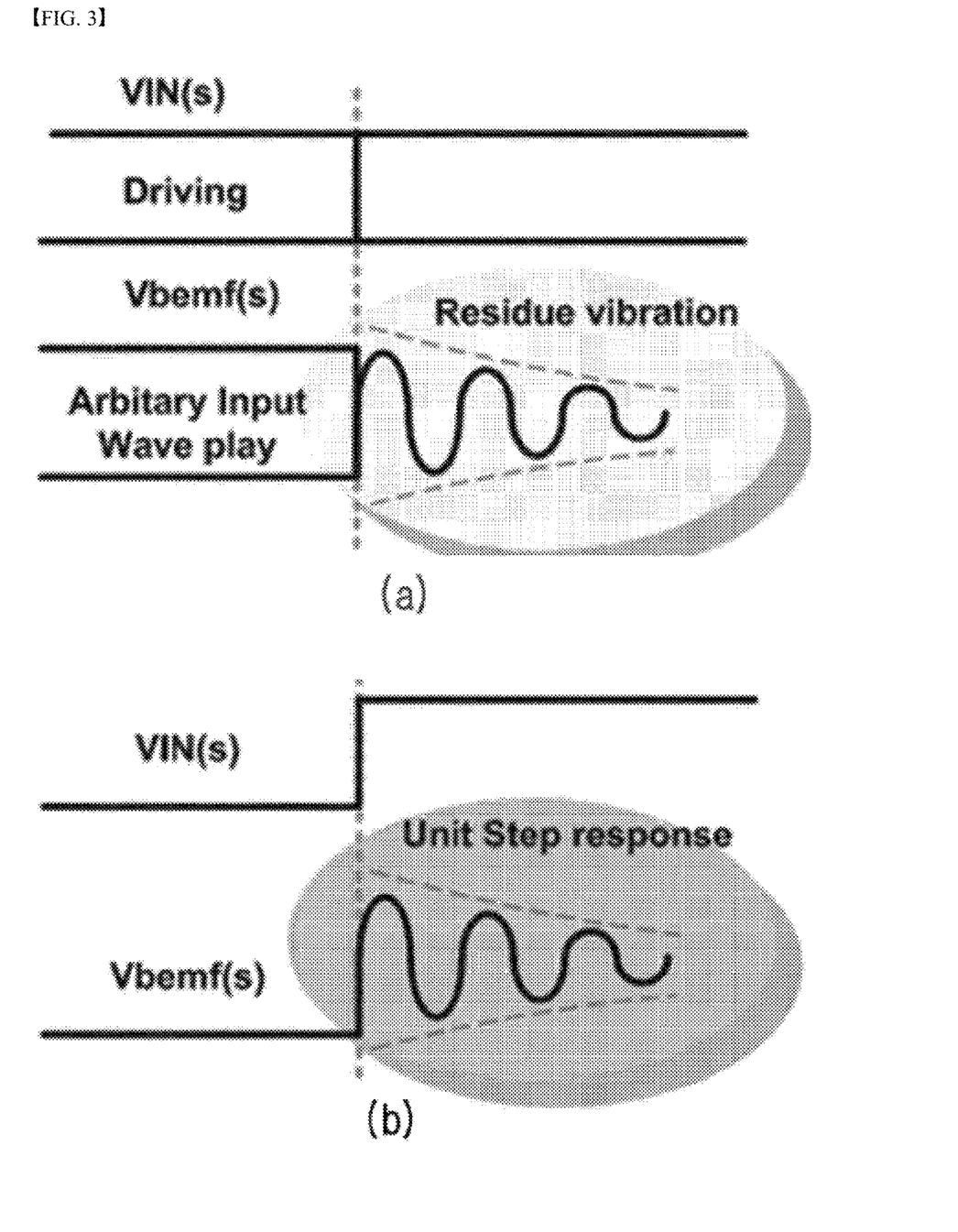
FIG. 3 is an exemplary diagram of a residual vibration waveform after LRA driving.

FIG. 3 exemplifies the residual vibration waveform after driving of the LRA, and the residual vibration after the linear resonant actuator (LRA) is driven appears as the waveform shown in (a). The residual vibration waveform is perfectly consistent with the vibration waveform generated when a unit step pulse (hereinafter referred to as a 'unit step driving wave') is applied to the linear resonant actuator (LRA) as shown in (b). Therefore, when it is possible to apply the unit step driving wave corresponding to the opposite of the residual vibration existing after the driving of the linear resonant actuator LRA at the exact opposite timing, it may be possible to remove the residual vibration at once. Accordingly, in the embodiment of the present invention, the unit step driving wave is used as a driving waveform for removing residual vibration of the linear resonant actuator.

Meanwhile, there is a matter of how much magnitude to apply braking as an additional factor to be determined. The voltage magnitude of the braking signal required to brake the actuator vibrating with residual vibration is related to a vibration gain of the linear resonant actuator (LRA). That is, the magnitude is related to the maximum vibration force, which is a value of acceleration at the resonant frequency. This is different for each linear resonant actuator (LRA), and may be checked by looking at a specification sheet of the LRA to be used. At this time, a value obtained by multiplying the maximum gain value by a certain constant becomes the required voltage magnitude of the braking signal (driving force, the amplitude of the unit step driving wave). Accordingly, the voltage magnitude of the braking signal may be used by setting one of the magnitude values in a linear relationship with the vibration gain of the linear resonant actuator (LRA).

However, as an additional consideration, it is preferable to generate and apply a braking signal having a high voltage magnitude by creating a high DC power supply using a boost converter when the voltage required for braking, that is, the voltage required to generate a braking signal having a high voltage magnitude, is higher than the voltage of the power supply, and using the created high DC power supply for a braking signal generator to be described later.

The last factor to be determined is when to apply the opposite waveform. In order to brake the actuator vibrating with residual vibration, a braking signal has to be applied at a point of time opposite to the residual vibration. For this purpose, a BEMF (Back-EMF) signal may be used that is generated from the motor coil of the linear resonant actuator (LRA) after the LRA is driven. The BEMF signal is a voltage induced by the presence of a coil inside the motor and shows a voltage waveform with the same shape as the residual vibration. Accordingly, when the braking signal is applied at a point of time when the BEMF signal passes through the zero point, the instantaneous residual vibration may be removed.

On the basis of the technical grounds discussed above, the device for removing residual vibration of the linear resonant actuator and the method for the same according to embodiments of the present invention will be described below in more detail.

Figure 4:
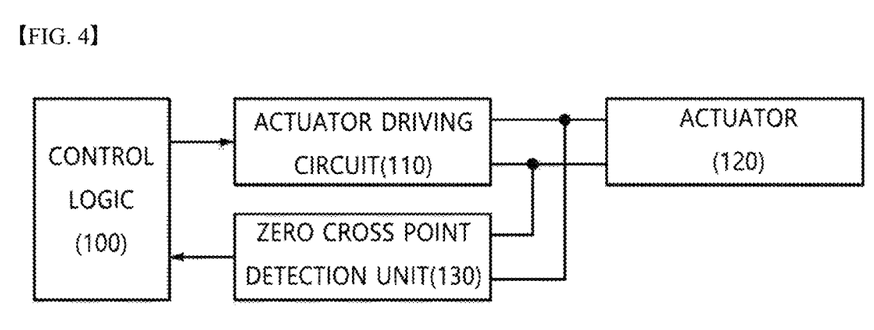
FIG. 4 is an exemplary configuration diagram of a device for removing residual vibration in a linear resonant actuator according to an embodiment of the present invention.

FIG. 4 illustrates a configuration diagram of a device for removing residual vibration of a linear resonant actuator according to an embodiment of the present invention, and FIGS. 5 to 8 each illustrate waves of residual vibration according to an embodiment of the present invention.

As shown in FIG. 4, the device for removing residual vibration of the linear resonant actuator (LRA) according to an embodiment of the present invention is characterized in that it includes, an actuator driving circuit 110 for driving the linear resonant actuator (LRA) 120, a control logic 100 for controlling driving of the linear resonant actuator 120, and a zero cross point detection unit 130 for detecting a zero cross point of a BEMF signal by the driving of the linear resonant actuator 120, in which the actuator driving circuit 110 further includes a braking signal generator for generating a braking signal that generates the same vibration waveform as a residual vibration waveform of the linear resonant actuator 120, and the control logic 100 controls the actuator driving circuit 110 (more precisely, a braking signal generator in the actuator driving circuit) so that the braking signal for removing the residual vibration after the driving of the linear resonant actuator 120 is applied to the linear resonant actuator 120 at a point of time when the BEMF signal crosses a zero point, the braking signal being applied in an opposite direction in which it is possible to cancel the residual vibration waveform of the linear resonant actuator 120.

For reference, the braking signal generator is characterized in that it may further include a boost converter, and the control logic 100 generates the braking signal by driving the boost converter when a voltage required to generate the braking signal is higher than a voltage of a power supply.

In addition, the braking signal is characterized in that it may be a unit step driving wave for generating the same vibration waveform as the residual vibration waveform of the linear resonant actuator 120, and the voltage magnitude of the braking signal may be set to one of magnitude values in a linear relationship with a vibration gain of the linear resonant actuator 120.

For reference, the control logic 100 includes an oscillator for clock generation, a control unit that controls driving of the LRA 120, and a pulse width modulation (PWM) generation unit that generates a PWM pulse according to the control of the control unit and outputs it to the actuator driving circuit 110, and a memory in which control program data required to execute the method for removing residual vibration of the linear resonant actuator according to an embodiment of the present invention and driving signal waveform data for driving and braking the actuator are stored.

In addition, the zero cross point detection unit 130 may further include a configuration for processing a voltage within a threshold band as noise by including an amplification unit for amplifying a BEMF signal of a fine size and two comparators using a low-threshold voltage and a high-threshold voltage from the amplified signal.

Hereinafter, operations of the device for removing residual vibration of the linear resonant actuator (LRA) including the above-described configuration will be described in detail.

First, the control logic 100 applies, for example, a resonant frequency to the linear resonant actuator (LRA) in response to a haptic implementation request to drive the LRA. When the haptic implementation request is stopped, then the control logic 100 stops the driving of the linear resonant actuator, and controls the actuator driving circuit 110 so that a braking signal for removing residual vibration after driving is applied.

In this case, as mentioned in FIG. 3, the braking signal is a unit step driving wave for generating the same vibration waveform as a residual vibration waveform of the linear resonant actuator 120, and is applied to the linear resonant actuator 120 at a point of time when a back BEMF signal of the linear resonant actuator 120 crosses a zero point, where when the braking signal is applied in an opposite direction in which it is possible to cancel the residual vibration waveform of the linear resonant actuator 120, the instantaneous residual vibration is stopped.

Figure 5:
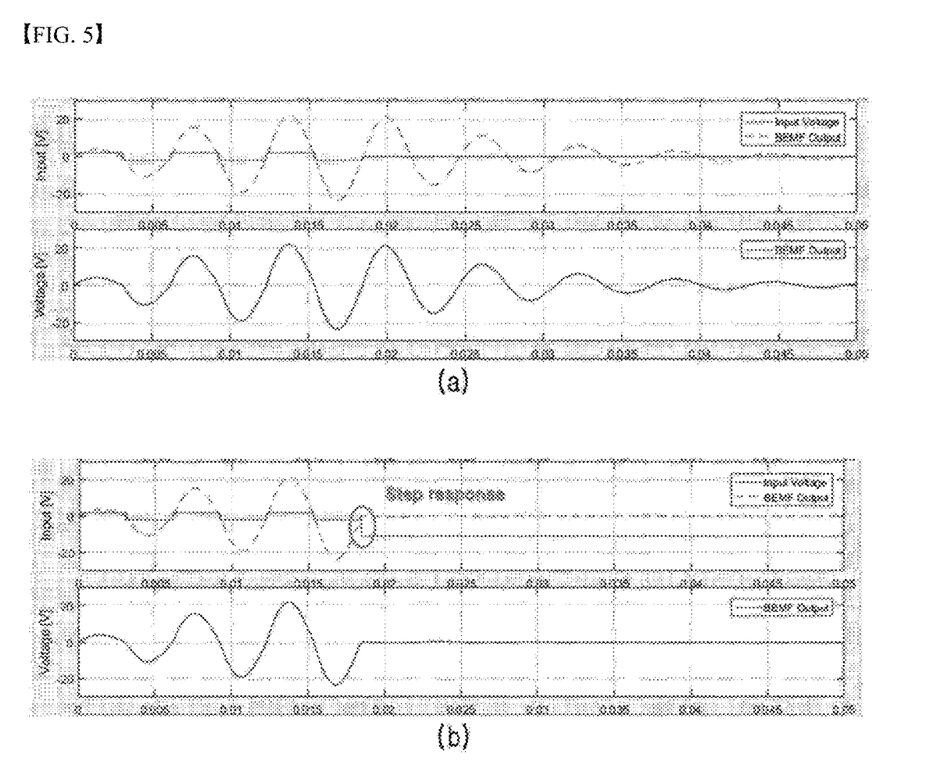
FIGS. 5 to 8 are exemplary diagrams of waveforms of residual vibration according to an embodiment of the present invention.

For reference, (a) of FIG. 5 shows a residual vibration waveform in a state in which the braking signal is not applied according to an embodiment of the present invention, that is, when there is no braking, whereas (b) of FIG. 5 shows a residual vibration waveform when the unit step driving wave is applied as a braking signal to the residual vibration at a point of time when the BEMF signal, which is being monitored after the linear resonant actuator 120 has been driven, crosses the zero cross point. Referring to (b) of FIG. 5, it can be observed that, unlike (a) of FIG. 5, the residual vibration is completely removed by one unit step driving wave.

However, the problem at this time is that the required voltage becomes about 11 V, which requires about three times more voltage than the voltage of 3 V of the power supply, and a method for solving the problem is to further include a boost converter in the actuator driving circuit 110 (power input terminal) as described above. In this case, when a high DC power supply is created using the boost converter and is used as a power supply for a braking signal generator, a braking voltage higher than the supply voltage applied to the chip may be created.

Figure 6:
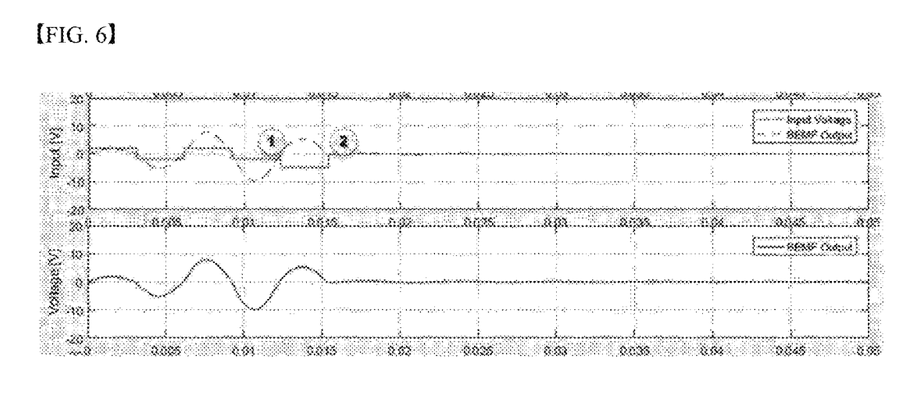

In addition to using the boost converter, a method for dividing and removing residual vibration by repeatedly applying a braking signal is also available. FIG. 6 shows a case in which the residual vibration illustrated in FIG. 5 is canceled with 4.84 V twice. As shown in FIG. 6, when the residual vibration is sequentially canceled several times, a waiting time corresponding to ½ of the resonance frequency of the linear resonant actuator is required.

Figure 7:
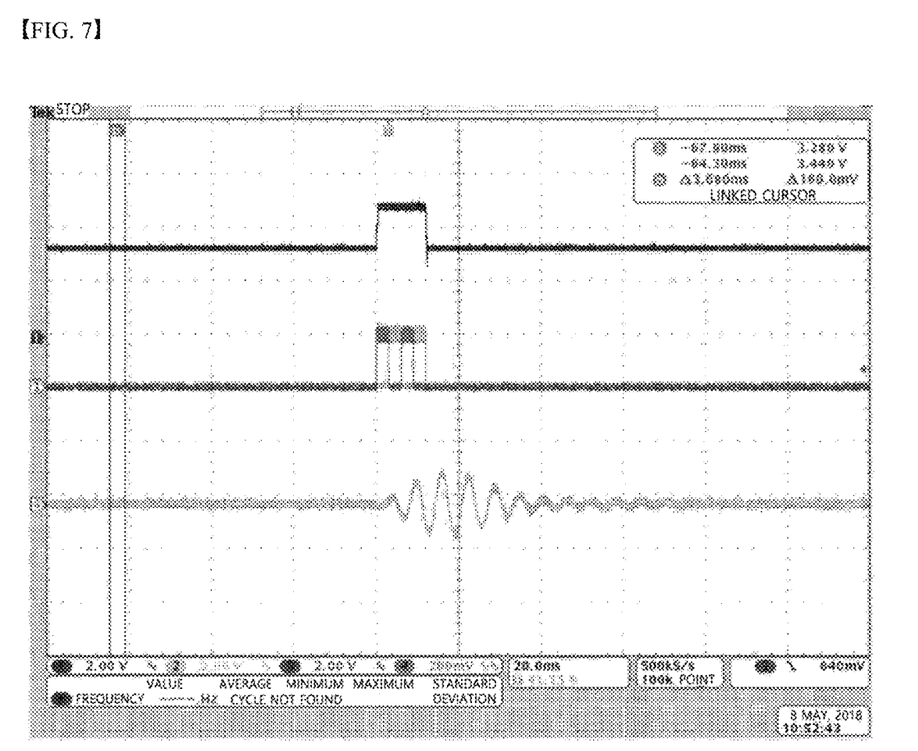
Figure 8:
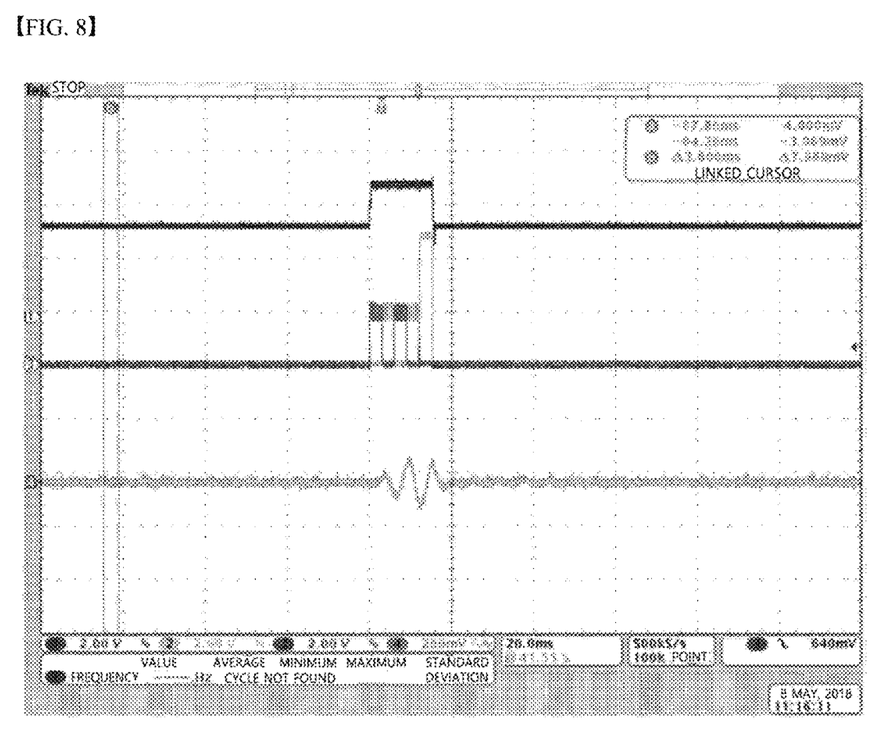

FIGS. 7 and 8 show waveforms of actual residual vibration measured using an oscilloscope by applying the braking signal according to an embodiment of the present invention, and more specifically, FIG. 7 shows a residual vibration waveform when there is no braking and FIG. 8 shows a residual vibration waveform when the residual vibration is removed twice using the unit step driving wave. Referring to FIG. 8, it can be seen that the residual vibration is removed after the linear resonant actuator is driven.

As described above, the device for removing residual vibration and the method for the same according to the embodiments of the present invention have an advantage of being capable of removing residual vibration of the linear resonant actuator in an instant by applying a unit step driving wave having the same vibration waveform characteristics as the residual vibration waveform of the linear resonant actuator as a braking signal, where the applying is done in the opposite direction in which the residual vibration waveform of the linear resonant actuator is cancelled at the point of time when the BEMF signal of the linear resonant actuator crosses the zero point, and furthermore, in the present invention, it is possible to create short and interrupted vibrations that have been previously impossible on screens of, for example, collisions and gun shot during watching video by minimizing the magnitude of the residual vibration and the residual vibration time of the linear resonant actuator, and as a result, the present invention has an effect of increasing the satisfaction of the user with the haptic sensibility.

In the above, the present invention has been described with specific matters such as specific components and limited embodiments and drawings, but these are only provided to help a more general understanding of the present invention, and the present invention is not limited to the above embodiments, and those skilled in the art to which the present invention pertains can devise various modifications and variations from the descriptions. Accordingly, the spirit of the present invention should not be limited to the above-described embodiments, and not only the claims described below, but also all modifications equivalent to the claims should fall within the scope of the spirit of the present invention.

What is claimed is:

1. A device for removing residual vibration of a linear resonant actuator, the device comprising:
    an actuator driving circuit for driving the linear resonant actuator;
    a control logic for controlling driving of the linear resonant actuator; and
    a zero cross point detection unit for detecting a zero cross point of a BEMF signal by the driving of the linear resonant actuator,
    wherein the actuator driving circuit includes:
a braking signal generator for generating and outputting a unit step driving wave that generates the same vibration waveform as a residual vibration waveform of the linear resonant actuator as a braking signal; and
wherein the braking signal generator further includes a boost converter,
and the control logic generates the braking signal by driving the boost converter when a voltage required to generate the braking signal is higher than a voltage of a power supply; and
    wherein the control logic controls the actuator driving circuit so that the braking signal for removing the residual vibration after the driving of the linear resonant actuator is applied to the linear resonant actuator at a point of time when the BEMF signal crosses a zero point, the braking signal being applied in an opposite direction in which it is possible to cancel the residual vibration waveform of the linear resonant actuator.

2. The device of claim 1, wherein a voltage magnitude of the braking signal is set to one of magnitude values in a linear relationship with a vibration gain of the linear resonant actuator.

* * * * *